Sept. 9, 1924.                    C. VITEK                    1,508,038
                                   CLAMP
                             Filed July 5, 1921              2 Sheets-Sheet 2

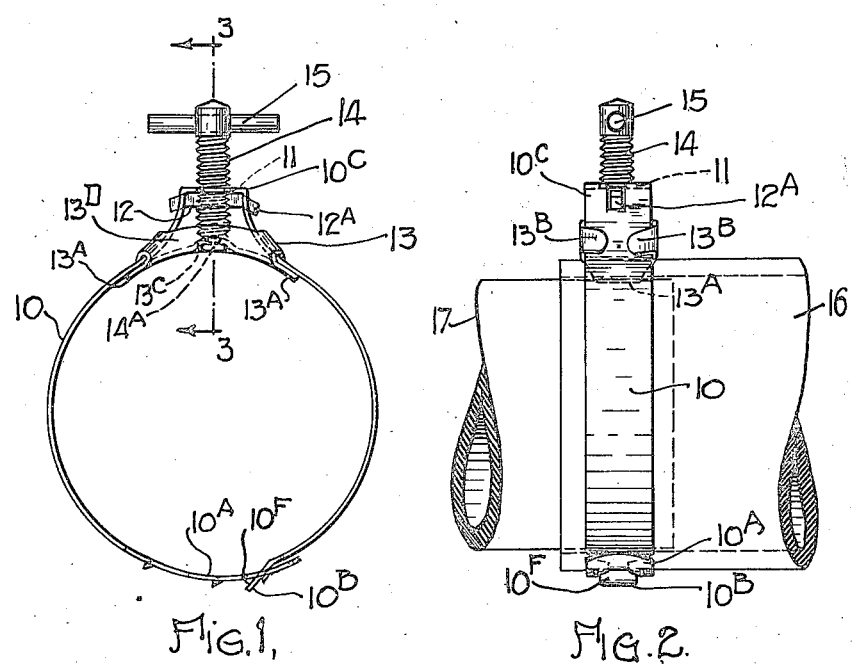
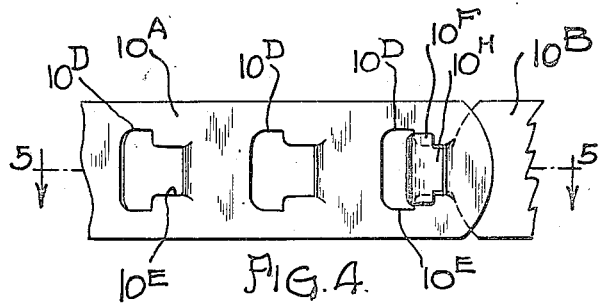
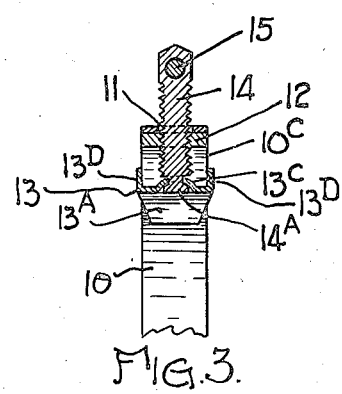
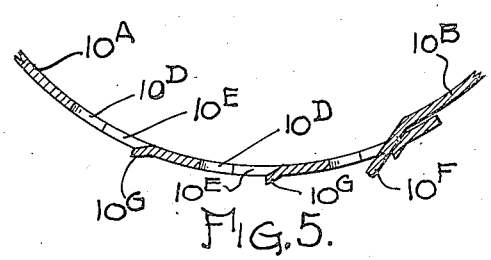

INVENTOR
Charles Vitek
BY
Frank J Schraeder Jr
Attorney

Patented Sept. 9, 1924.

1,508,038

UNITED STATES PATENT OFFICE.

CHARLES VITEK, OF MAYWOOD, ILLINOIS, ASSIGNOR TO BENJAMIN A. TETZLAFF, OF GREEN BAY, WISCONSIN.

CLAMP.

Application filed July 5, 1921. Serial No. 482,621.

*To all whom it may concern:*

Be it known that I, CHARLES VITEK, a citizen of the Republic of Czechoslovakia, residing at Maywood, in the county of Cook and State of Illinois, have invented a new and useful Improvement in Clamps, of which the following is a specification.

This invention relates to improvements in hose clamps.

An object of the invention is to provide a hose or pipe clamp in which, through simple manipulation of an adjusting screw, the entire circumference of the outer hose or pipe, and particularly the side walls of the same are firmly gripped and pressed against the inner one.

Another object of the invention is to provide means in this clamp for readily and positively releasing the clamp from the side walls when it is desired to disconnect one of the tubular members from the other.

It is, furthermore, an object of the invention to provide a novel form of a hose clamp, which can be manufactured at very small expense, and which can be manipulated in a very simple way without auxiliary tools, for fastening two tubular members at their telescoping ends to each other.

With these and other objects in view, an embodiment of the invention is illustrated in the accompanying drawings, and is described in the following specification, the novel features being pointed out in the appended claims.

In the drawings:

Fig. 1 is a side elevation of the clamp;

Fig. 2 is an end elevation of the same;

Fig. 3 is a section taken on line 3—3 of Fig. 1 showing the actuating thumb screw;

Fig. 4 is a bottom plan view in larger scale, showing the connecting means at the ends of the clamp band.

Fig. 5 is a section taken on line 5—5 of Fig. 4.

Figure 6:
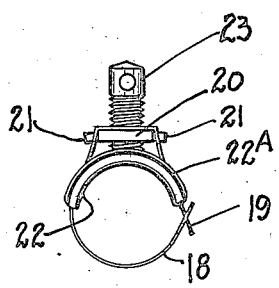
Figure 7:
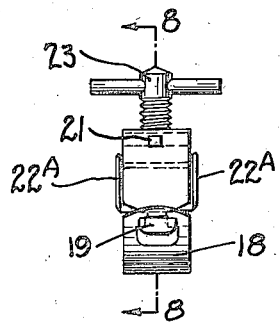
Figure 8:
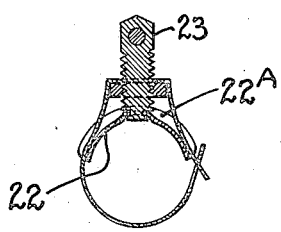

Figs. 6 and 7 illustrate respectively, side and end elevation of a modification of my invention adaptable for connecting telescoping members of relatively small diameter. Fig. 8 is a cross section of Fig. 7 taken on line 8—8 thereof.

In Fig. 2 the clamp is illustrated in position to connect two telescoping tubular members; namely, a flexible hose 16 and a rigid pipe 17. The clamp proper 10 comprises a flexible strip of metal bent into the shape of semi-circular legs having ends $10^a$ and $10^b$, which are united near their top ends by an integral straight member $10^c$ raised above the highest point of the tubular part, to which the clamp is to be attached. The free ends of the legs may be interconnected at the bottom by the slots and tongue as shown clearly in Figures 4 and 5. The clamp may readily be adjusted to pipes of slightly varying diameter, depending upon the insertion of the tongue $10^f$ on one leg into one of the slots $10^d$ of the other leg. The tongue $10^f$ is formed with a short narrow neck $10^h$ which is adapted to slide into the narrower portion $10^e$ of the slot $10^d$ so that the head $10^i$ will overlap the edges thereof for locking engagement.

A thumb screw 14 is inserted through a large hole 11 in the straight integral portion $10^c$ of the clamp and passes through a winged nut 12, which is held slightly below said integral portion by means of the oppositely disposed integral wings $12^a$ projecting into slots within the band just below the portion $10^c$, whereby the rotation of the nut on the screw 14 is prevented. The inner or foot end of the screw 14, is provided with a constructed portion having a head $14^a$ having a rotary connection in the depressed portion $13^c$ of the bridge 13.

For the purpose of securing the circumferential gripping engagement of the clamp with the side walls of the hose 16, a bridge 13 is provided which supports and holds the upper portions of the legs $10^a$ and $10^b$ close to the side wall of the hose. This bridge is illustrated in the embodiment of an arcuate base member $13^a$, which extends between and on the underside of the upper portions of the legs $10^a$ and $10^b$. The two side integral upright walls $13^d$ having bent arms $13^b$ which overlap the legs $10^a$ and $10^b$ and thus retain same to secure the circumferential gripping engagement of the locked legs during the rotation of the screw 14.

Reverse rotation of the screw 14 will obviously tighten and release the clamping action of the legs about the hose 16, that is, when the screw 14 is rotated by means of the thumb bar 15, to effect the tightening or release of the clamp the foot end $14^a$ of the screw, rotating in the depressed portion $13^c$ of the bridge 13, will obviously respectively raise or lower the nut 12 causing the legs 12 to tighten or to spread, and thus to engage or disengage from the walls of the outer tubular member 16.

In the modification illustrated by Figs. 6, 7 and 8, the construction is similar to that above described, except that in this case, the connection 19 is preferably at one side of the clamp, and as the bridge 22 engages a substantial portion of the relatively small telescoping members which may be engaged thereby, the rim walls 22$^a$ do not in this case require the angularly bent integral arms 13$^b$ above, so that the bridge is substantially of a uniform U-section, having the perpendicular side or rim walls 22$^a$ adapted to guide the metal clamping band 18 therebetween.

The nut 20 is shown also preferably with wings or lugs 21 extending through slots in the band 18. The screw 23 can be made in all cases with any kind of head and is shown with a loose mounting within the bridge 22.

I claim:

1. A hose clamp comprising a flexible band extending around one-half of the circumference of the hose, a bridge embracing the other half of the circumference of the hose, a nut held between a bent portion of said band and a screw extending thru said band and thru said nut and having its end in engagement with said bridge.

2. In a hose clamp as embodied in claim 1, said nut having oppositely disposed lugs extending thru said band.

In witness whereof, I have hereunto subscribed my name this 30th day of June, 1921.

CHARLES VITEK.